(12) United States Patent
Chang

(10) Patent No.: US 10,557,033 B2
(45) Date of Patent: Feb. 11, 2020

(54) RESIN COMPOSITION SUITABLE FOR RIGID-FLEX BOARD AND USE THEREOF

(71) Applicant: Elite Material Co., Ltd., Taoyuan (TW)

(72) Inventor: Shu-Hao Chang, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 168 days.

(21) Appl. No.: 15/373,915

(22) Filed: Dec. 9, 2016

(65) Prior Publication Data

US 2018/0086910 A1 Mar. 29, 2018

(30) Foreign Application Priority Data

Sep. 23, 2016 (TW) .............................. 105130932 A

(51) Int. Cl.
| | |
|---|---|
| *C08L 63/00* | (2006.01) |
| *C08G 59/50* | (2006.01) |
| *C08J 5/24* | (2006.01) |
| *D06M 15/53* | (2006.01) |
| *D06M 15/55* | (2006.01) |
| *D06M 15/61* | (2006.01) |
| *D06M 15/693* | (2006.01) |

(52) U.S. Cl.
CPC ............ *C08L 63/00* (2013.01); *C08G 59/504* (2013.01); *C08J 5/24* (2013.01); *D06M 15/53* (2013.01); *D06M 15/55* (2013.01); *D06M 15/61* (2013.01); *D06M 15/693* (2013.01); *C08J 2363/00* (2013.01); *C08J 2409/02* (2013.01); *C08J 2415/00* (2013.01); *C08J 2463/04* (2013.01); *C08J 2471/02* (2013.01); *C08L 2205/02* (2013.01); *C08L 2205/03* (2013.01)

(58) Field of Classification Search
CPC .......... C08L 63/00; C08G 59/504; C08J 5/24; D06M 15/53; D06M 15/55; D06M 15/61; D06M 15/693
USPC ........................................................ 442/117
See application file for complete search history.

(56) References Cited

U.S. PATENT DOCUMENTS

| | | | | |
|---|---|---|---|---|
| 8,029,889 B1 * | 10/2011 | Li | ........................... | C08G 61/12 |
| | | | | 428/292.1 |
| 2010/0316785 A1 * | 12/2010 | Morinaga | ................. | A23F 5/14 |
| | | | | 426/595 |
| 2011/0319564 A1 * | 12/2011 | Corley | ............... | C08G 59/5006 |
| | | | | 525/132 |

* cited by examiner

*Primary Examiner* — Vincent Tatesure
(74) *Attorney, Agent, or Firm* — Muncy, Geissler, Olds & Lowe, P.C.

(57) ABSTRACT

The disclosure relates to a resin composition, comprising an epoxy resin, a high molecular weight polyetheramine and an amine-terminated acrylonitrile rubber. Various products can be made from the resin composition, such as prepregs, laminates, printed circuit boards or rigid-flex boards, in which one, multiple or all of the following properties can be met: low resin flow, low dust weight loss, high peel strength at room temperature and at high temperature, low moisture absorption rate, and better varnish stability.

12 Claims, No Drawings

RESIN COMPOSITION SUITABLE FOR RIGID-FLEX BOARD AND USE THEREOF

CROSS-REFERENCE TO RELATED APPLICATION

This application claims the priority benefits of Taiwan Patent Application No. 105130932, filed on Sep. 23, 2016, the entirety of which is hereby incorporated by reference herein and made as a part of this specification.

BACKGROUND OF THE INVENTION

1. Field of the Invention

The present disclosure generally relates to a resin composition and more particularly to a resin composition meeting the demands and desirable properties of a rigid-flex board and other products.

2. Description of Related Art

Conventional printed circuit boards primarily contain a glass fiber fabric as the base material and therefore have rigid texture and are also known as rigid boards, which have no flexibility. Electronic products made solely of rigid boards, owing to the limited structural configuration, have many limitations in size and shape design of the end products.

To resolve such problems, a flexible material such as a polyimide film (PI film) has been used in the industry as at least a portion of the flexible printed circuit (FPC) board, also known as a flexible board. Flexible boards have the advantages of thinner in size, flexibility and capability of changing shape according to spatial configuration for three-dimensional wiring. However, since flexible boards have the disadvantages of higher costs, difficulty in multilayer PCB processing, low weight bearing capacity and the like, the use of flexible boards alone is still unable to meet the various needs of electronic product design.

Accordingly, a rigid-flex board has been proposed, which combines a flexible board and a rigid board and is therefore also known as a rigid-flex board. It makes use of the rigidity of a rigid board and the flexibility of a flexible board to meet the demands in structural design of various products. Conventionally, the connection between two rigid boards or a rigid board with a flexible board requires a connector and a wire. However, high-density design is rarely achieved due to the bulk size of the connector, and therefore it is later devised to use a low-flow prepreg for bonding a flexible board and a rigid board so as to form the connection between two rigid boards or between a rigid board and a flexible board, thereby saving the space for the connector and alleviating the problems associated to signal transmission attenuation.

From the design and manufacturing perspectives, in order to connect the flexible board and the rigid board while avoiding fouling the etched circuit pattern formed on the flexible board and the rigid board, a prepreg with low flow property is generally required.

However, resin compositions currently available for such prepregs, although satisfying the requirements of low flow in, fail to perform satisfactorily in other properties. For example, the contamination caused by dust loss (e.g. fallen powders) during prepregs processing will lower the yield, and sufficient peel strength between the copper foil and the insulation layer of a laminate at high temperature are difficult to achieve. Therefore, there is a need to propose new solutions.

SUMMARY OF THE INVENTION

Accordingly, the present disclosure provides a resin composition, which can meet not only the low flow characteristics, but also at least one other property improvement, thereby satisfying the needs of different applications in a variety of products, such as the rigid-flex boards made from prepregs with low resin flow.

For example, in one embodiment, the present disclosure discloses a resin composition which has low resin flow property, such as having a resin flow of less than or equal to 60 mil, preferably less than or equal to 50, 40, 30, 25, 20 or 15 mil, for example between 15 mil and 60 mil.

In one embodiment, the present disclosure discloses a resin composition and a product made therefrom, such as a prepreg, a laminate, a printed circuit board or a rigid-flex board, which can meet the aforementioned low resin flow property and further have one, multiple or all of the following properties:

(1) low dust weight loss, such as having a dust weight loss of less than or equal to 0.3%, preferably less than or equal to 0.2%, 0.15%, 0.10%, or 0.09%, such as between 0.09% and 0.3%, preferably between 0.09% and 0.2%;

(2) high peel strength at high temperature (P/S, high peel strength between the copper foil and the insulation layer of a laminate as measured at high temperature); for example, the peel strength at 280° C. as measured by reference to IPC-TM-650 2.4.8 is greater than or equal to 5.0 lb/in, preferably greater than or equal to 5.3 lb/in, such as between 5.0 lb/in and 6.0 lb/in;

(3) high peel strength at room temperature (high peel strength between the copper foil and the insulation layer of a laminate as measured at room temperature); for example, the peel strength at room temperature (about 25° C.) as measured by reference to IPC-TM-650 2.4.8 is greater than or equal to 6.8 lb/in, preferably greater than or equal to 7.0 lb/in, 7.2 lb/in, 7.4 lb/in or 7.5 lb/in, such as between 6.8 lb/in and 7.8 lb/in;

(4) low moisture absorption rate, such as having a moisture absorption rate at room temperature as measured by reference to IPC-TM-650 2.6.2.1a of less than or equal to 0.1%, preferably less than or equal to 0.09%, more preferably about 0.08%, such as a moisture absorption rate of between 0.08% and 0.1%;

(5) a prepreg thus made having the following properties: after being subject to hot pressing at a pressure of 1452±70 kgf/16 in$^2$, having a resin flow as measured by reference to IPC-TM-650 2.3.17.2 of less than or equal to 25 mil; and/or having a dust weight loss of less than or equal to 0.2%;

(6) a laminate thus made having the following properties: having a peel strength at 280° C. as measured by reference to IPC-TM-650 2.4.8 of greater than or equal to 5.3 lb/in; having a peel strength at room temperature as measured by reference to IPC-TM-650 2.4.8 of greater than or equal to 6.8 lb/in; and/or having a moisture absorption rate at room temperature as measured by reference to IPC-TM-650 2.6.2.1a of less than or equal to 0.1%; and (7) high varnish compatibility and/or varnish stability: no layer separation is observed after the resin composition has been stirred and allowed to stand for 12 hours at room temperature; in addition, no particulate aggregation is formed; namely, no particles having a diameter of greater than 1 mm are observed by naked eyes.

To achieve the enhancement of any one or more of the foregoing properties, in one embodiment, the present disclosure discloses a resin composition, comprising an epoxy resin, a high molecular weight polyetheramine, and an amine-terminated acrylonitrile rubber.

Unless otherwise specified, the amount of any one of the above three components and the ratio between the components can be adjusted as needed.

In one embodiment, the present disclosure discloses a resin composition, comprising 100 parts by weight of an epoxy resin; 5 to 15 parts by weight of a high molecular weight polyetheramine; and 3 to 10 parts by weight of an amine-terminated acrylonitrile rubber.

In a preferred embodiment, the aforementioned high molecular weight polyetheramine has a weight average molecular weight of greater than or equal to 1000, for example between 1000 and 5000, or between 1500 and 3000.

Unless otherwise specified, any kind of high molecular weight polyetheramine can be used in the aforementioned resin composition. For example, the high molecular weight polyetheramine may have the following structure:

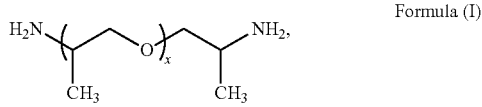

Formula (I)

wherein $15 \leq x \leq 80$, such as $25 \leq x \leq 50$.

In a preferred embodiment, the aforementioned amine-terminated acrylonitrile rubber may be a butadiene-acrylonitrile copolymer having a terminal amine structure, such as an amine-terminated butadiene-acrylonitrile copolymer (ATBN).

For example, the aforementioned amine-terminated acrylonitrile rubber may be any one of the following compounds or a combination thereof:

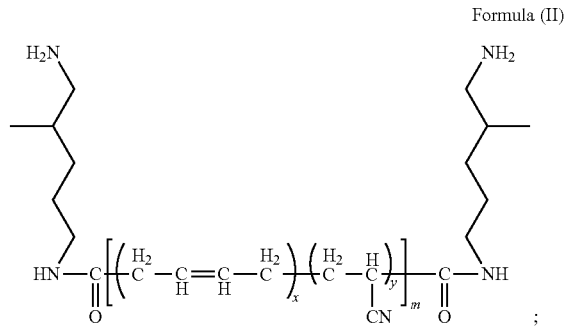

Formula (II)

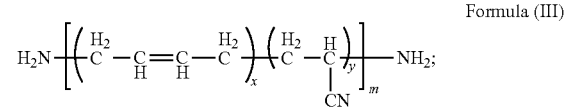

Formula (III)

Formula (IV)

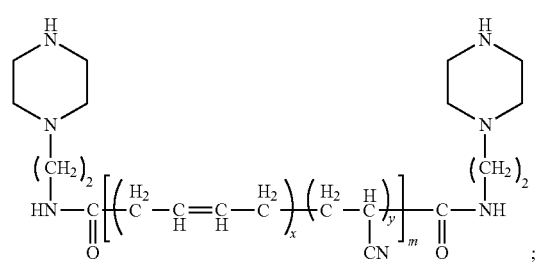

wherein $60 \leq m \leq 75$, and wherein x is 60% to 90% and y is 10% to 40% with the proviso that the sum of x and y is 100%.

In addition to the aforementioned three main components, the resin composition may be optionally added with other components, such as amine curing agent, phenoxy resin, polyvinyl butyral, polyphenylene oxide, polyolefin, polyester resin, styrene maleic anhydride, benzoxazine resin, maleimide, cyanate ester resin and a combination thereof.

In addition, the resin composition may be optionally added with other components, such as a flame retardant, an inorganic filler, a curing accelerator, a solvent, a silane coupling agent or a combination thereof.

DESCRIPTION OF THE EMBODIMENTS

For a person having ordinary skill in the art to appreciate the characteristics and effects of the present disclosure, the following general description and definitions of the terms as used in the specification and the claims are given hereby. Unless otherwise specified, all technical and scientific terms used herein have ordinary meanings as understood by the person having ordinary skill in the art. When there is a conflict, the definition in the present specification shall control.

As used herein, the term "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions defined as a numeric range or percentage range format are merely for convenience and brevity and therefore should be interpreted as encompassing and specifically disclosing all possible subranges and individual numerals or values therein, particularly all integers therein. For example, a range of "1 to 8" or "between 1 and 8" should be understood as explicitly disclosing all subranges such as 1 to 7, 2 to 8, 2 to 6, 3 to 6, 4 to 8, 3 to 8 and so no, particularly all subranges defined by integers, as well as disclosing all individual values such as 1, 2, 3, 4, 5, 6, 7 and 8. Unless otherwise defined, the aforesaid interpretation rule should be applied throughout the present disclosure regardless of broadness of the scope.

Whenever amount or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, "40.0" should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$" and Y is described as being "selected from a group consisting of $Y_1$, $Y_2$ and $Y_3$," the disclosure of any combination of X is $X_1$ and/or $X_2$ and/or $X_3$ and Y is $Y_1$ and/or $Y_2$ and/or $Y_3$ is fully presented.

The present disclosure is further described in conjunction with the embodiments and examples below. It is understood that these embodiments and examples are merely exemplary without limiting the scope of the present disclosure or applications thereof. In addition, the present disclosure is not limited to any theory described in the foregoing background or summary or the following detailed description of embodiments or examples.

Resin Composition

One of the main purposes of the present disclosure is to provide a resin composition, mainly comprising the following three components: an epoxy resin, a high molecular weight polyetheramine, and an amine-terminated acrylonitrile rubber.

The amount of any one of the abovementioned three components, and the ratio between each component can be adjusted according to the needs. For example, in one embodiment, the present disclosure discloses a resin composition, comprising 100 parts by weight of an epoxy resin; 5 to 15 parts by weight of a high molecular weight polyetheramine; and 3 to 10 parts by weight of an amine-terminated acrylonitrile rubber. In terms of the application as a rigid-flex board, the composition ratio of the components described above may achieve preferred overall properties. However, in other applications, the amount and ratio of the components of the resin composition are not limited thereto.

In one embodiment, the aforementioned epoxy resin may be various types of epoxy resins known in the art including, but not limited thereto, for example, bisphenol A epoxy resin, bisphenol F epoxy resin, bisphenol S epoxy resin, bisphenol AD epoxy resin, phenol novolac epoxy resin, trifunctional epoxy resin, tetrafunctional epoxy resin, multifunctional epoxy resin, dicyclopentadiene (DCPD) epoxy resin, phosphorus-containing epoxy resin, 9,10-dihydro-9-oxa-10-phosphaphenanthrene-10-oxide (DOPO) epoxy resin, DOPO-HQ epoxy resin, p-xylene epoxy resin, naphthalene epoxy resin (e.g., naphthol type epoxy resin), benzofuran type epoxy resin, isocyanate-modified epoxy resin, phenol aralkyl novolac epoxy resin; wherein the phenol novolac epoxy resin may be bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin; wherein the phosphorus-containing epoxy resin may be DOPO epoxy resin, DOPO-HQ epoxy resin or combinations thereof. The aforementioned DOPO epoxy resin may be selected from one or two or more of DOPO-containing phenolic novolac epoxy resin, DOPO-containing cresol novolac epoxy resin and DOPO-containing bisphenol-A novolac epoxy resin; the aforementioned DOPO-HQ epoxy resin may be selected from one or two or more of DOPO-HQ-containing phenolic novolac epoxy resin, DOPO-HQ-containing cresol novolac epoxy resin and DOPO-HQ-containing bisphenol-A novolac epoxy resin.

In one embodiment, the aforementioned high molecular weight polyetheramine may be a polyetheramine with higher weight average molecular weight; for example, the weight average molecular weight may be greater than or equal to 1000, such as between 1000 and 5000, or between 1500 and 3000. For example, the high molecular weight polyetheramine may have the following structure:

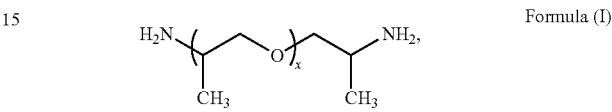

Formula (I)

wherein $15 \leq x \leq 80$, such as $25 \leq x \leq 50$.

Suitable high molecular weight polyetheramine can generally be available commercially, for example, as products sold by Huntsman, including any one of D-2000, D-2010 and D-4000 or any combination of two or three thereof. In contrast, mere use of low molecular weight polyetheramine cannot achieve any one or more of the aforementioned effects of the present disclosure; examples of low molecular weight polyetheramine include a polyetheramine having a weight average molecular weight of less than 500, such as products sold by Huntsman, including D-230 and D-400.

In one embodiment, the aforementioned amine-terminated acrylonitrile rubber may be a butadiene-acrylonitrile copolymer having a terminal amine structure, such as an amine-terminated butadiene-acrylonitrile copolymer (ATBN). For example, the aforementioned amine-terminated acrylonitrile rubber may be any one of the following compounds or combinations thereof:

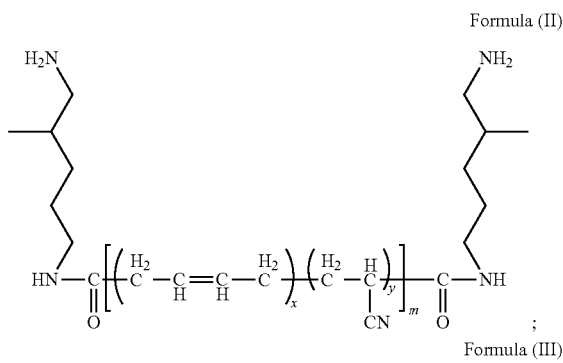

Formula (II)

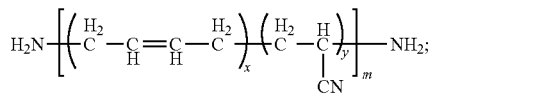

Formula (III)

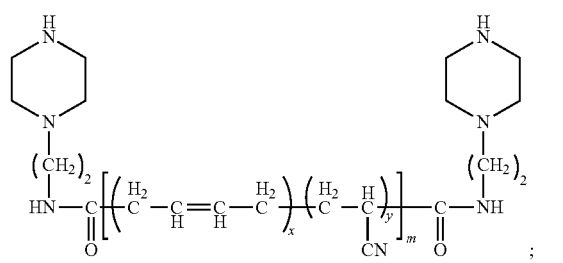

Formula (IV)

wherein 60≤m≤75, such as m is 62; and wherein x is 60% to 90% and y is 10% to 40% with the proviso that the sum of x and y is 100%. A suitable amine-terminated acrylonitrile rubber can generally be available commercially, such as from CVC Thermoset, including products 1300X21, 1300X16, 1300X35, 1300X45 and 1300X42, which may be used individually or as a combination of any two or more thereof. More preferably, the amine-terminated acrylonitrile rubber may be 1300X45 (as the structure of Formula (IV), wherein x=82%, y=18%, and m=62).

In addition to the aforementioned three main components, the resin composition may be optionally added with other components, such as any type of curing agents, for example amine curing agent, phenoxy resin, polyvinyl butyral, polyphenylene oxide, polyolefin, polyester resin, styrene maleic anhydride, benzoxazine resin, maleimide, cyanate ester resin, or a combination thereof. For example, the resin composition may be optionally added with a curing agent suitable for the low flow resin.

For instance, the amine curing agent may be a curing agent having an amino group, preferably a curing agent having a diamino group. More specifically, the amine curing agent may be any one of diamino diphenyl sulfone, diamino diphenyl methane, diamino diphenyl ether, diamino diphenyl sulfide, dicyandiamide (DICY), or a combination thereof. For example, dicyandiamide may include, but is not limited to, dicyandiamide compounds known to the industry, such as, but not limited to, DICY available from Kingyorker Enterprise Co., Ltd., or Adeka HT2844 (modified dicyandiamide) available from Asahi Denka, the structure of which is as follows:

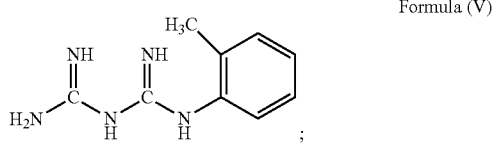

Formula (V)

based on 100 parts by weight of the epoxy resin, the amount of the dicyandiamide may range from 0.5 to 3 parts by weight, preferably 1 to 3 parts by weight, and more preferably 2 to 3 parts by weight.

For instance, the phenoxy resin may include but not limited to products available from InChem Co., including PKHA, PKHB, PKHB+, PKHC, PKHH, PKHJ, PKFE, PKHP-200, or products available from Nippon Steel & Sumikin Chemical Co., Ltd., such as YP50S. Based on 100 parts by weight of the epoxy resin, the amount of the phenoxy resin may range from 10 to 30 parts by weight, preferably 15 to 25 parts by weight.

For instance, the polyphenylene oxide includes, but not limited to, hydroxy polyphenylene oxide.

For instance, the polyolefin comprises styrene-butadiene-divinylbenzene terpolymer, styrene-butadiene-maleic anhydride terpolymer, vinyl-polybutadiene-urethane oligomer, styrene-butadiene copolymer, hydrogenated styrene-butadiene copolymer, styrene-isoprene copolymer, hydrogenated styrene-isoprene copolymer, or a combination thereof. Preferably, the polyolefin may be styrene-butadiene-divinylbenzene terpolymer, styrene-butadiene-maleic anhydride terpolymer, vinyl-polybutadiene-urethane oligomer, or combinations thereof.

For instance, the polyester resin can be obtained by esterifying a dicarboxylic acid group of an aromatic compound with a dihydroxyl group of an aromatic compound, such as HPC-8000T65 available from D.I.C. Corporation.

For instance, in the aforementioned styrene maleic anhydride, the ratio of styrene (S) to maleic anhydride (MA) can be 1/1, 2/1, 3/1, 4/1, 6/1, 8/1 or 12/1, such as the styrene maleic anhydride copolymers SMA-1000, SMA-2000, SMA-3000, EF-30, EF-40, EF-60 and EF-80 available from Cray Valley. In addition, the styrene maleic anhydride copolymer may also be an esterified styrene maleic anhydride copolymer, such as the products sold by Cray Valley, including SMA1440, SMA17352, SMA2625, SMA3840 and SMA31890.

For instance, the benzoxazine resin may be a bisphenol A type benzoxazine resin, a bisphenol F type benzoxazine resin or a phenolphthalein type benzoxazine resin, a dicyclopentadiene benzoxazine resin, a phosphorus-containing benzoxazine resin, such as LZ-8270, LZ-8280 or LZ-8290 produced by Huntsman, or HFB-2006M available from Showa Highpolymer Co., Ltd.

For instance, the maleimide may be 4,4'-diphenylmethane bismaleimide, an oligomer of phenylmethane maleimide, m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, 1,6-bismaleimide-(2,2,4-trimethy) hexane or combinations thereof.

For instance, the cyanate ester resin can be any cyanate ester with a Ar—O—C≡N structure without specific limitations, wherein Ar may be a substituted or unsubstituted aromatic group, phenol novolac, bisphenol A, bisphenol A novolac, bisphenol F, bisphenol F novolac or phenolphthalein.

The aforementioned cyanate ester resin may be Primaset PT-15, PT-30S, PT-60S, CT-90, BADCY, BA-100-10T, BA-200, BA-230S, BA-300S, BTP-2500, BTP-6020S, DT-4000, DT-7000, Methylcy, ME-240S and so forth, available from Lonza.

In addition, the resin composition may also optionally contain various additives, such as a flame retardant, an inorganic filler, a curing accelerator, a solvent, a silane coupling agent or a combination thereof.

For instance, the flame retardant may be various flame retardants including, but not limited to, phosphorus-containing compounds, nitrogen-containing compounds or combinations thereof.

The phosphorus-containing compounds may be at least one of the following compounds, but not limited thereto: bisphenol diphenyl phosphate, ammonium polyphosphate, hydroquinone bis-(diphenyl phosphate), bisphenol A bis-(diphenyl phosphate), tri(2-carboxyethyl)phosphine (TCEP), tris(chloroisopropyl) phosphate, trimethyl phosphate (TMP), dimethyl methyl phosphonate (DMMP), resorcinol bis(dixylenyl phosphate) (RDXP, such as PX-200, available from Daihachi Chemical Industry Co., Ltd.), phosphazene compound (such as SPB-100, available from Otsuka Chemical Co., Ltd.), m-phenylene methylphosphonate (PMP), melamine polyphosphate, 9,10-dihydro-9-oxa-10-phosphaphenanthrene-10-oxide (DOPO), DOPO-containing phenolic resin (such as DOPO-HQ, DOPO-PN, DOPO-BPN), DOPO-containing epoxy resin, DOPO-HQ-containing epoxy resin and so forth, wherein DOPO-BPN may be bisphenol novolac compounds such as DOPO-bisphenol A novolac (DOPO-BPAN), DOPO-bisphenol F novolac (DOPO-BPFN), DOPO-bisphenol S novolac (DOPO-BPSN), diphenyl phosphine oxide (DPPO) compound, diphenylphosphine oxide derivatives and so forth.

The nitrogen-containing compounds may be at least one of the following compounds, but not limited thereto: amino triazine novolac (ATN), melamine cyanurate and trihydroxy ethyl isocyanurate.

For instance, the inorganic filler may be various inorganic fillers, including at least one or more of, but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride, and calcined kaolin.

For instance, the curing accelerator may be various curing accelerators, including but not limited to catalysts, such as a Lewis base, a Lewis acid or a peroxide, wherein the Lewis base may comprise one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise a metal salt compound, such as those of Mn, Fe, Co, Ni, Cu, Zn and so forth, and a metallic catalyst, such as zinc octanoate, cobalt octanoate and so forth. The peroxide may comprise dicumyl peroxide, t-butyl peroxybenzoate and preferably di-t-butylperoxydiisopropylbenzene.

For instance, the solvent may be various solvents, including but not limited to methanol, ethanol, ethylene glycol monomethyl ether, acetone, butanone (also known as methyl ethyl ketone), methyl isobutyl ketone, cyclohexanone, toluene, xylene, methoxyethyl acetate, ethoxyethyl acetate, propoxyethyl acetate, ethyl acetate, dimethyl formamide, propylene glycol methyl ether or a solvent mixture thereof.

For instance, the silane coupling agent may be various silane coupling agents, including but not limited to silane and siloxane.

In a preferred embodiment, the resin composition comprises: 100 parts by weight of an epoxy resin; 5 to 15 parts by weight of a high molecular weight polyetheramine; and 3 to 10 parts by weight of an amine-terminated acrylonitrile rubber, wherein the high molecular weight polyetheramine has the following structure:

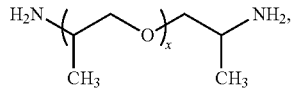

wherein 25≤x≤50; and wherein the amine-terminated acrylonitrile rubber is an amine-terminated butadiene-acrylonitrile copolymer.

Product of Resin Composition

The aforementioned resin composition can be utilized to form various products by a variety of processing methods, such as the components applicable to all types of electronic products, which comprise but not limited to a prepreg, a laminate, a printed circuit board and a rigid-flex board.

For instance, the resin composition of each embodiment in the present disclosure can be utilized to form prepregs, which have a reinforcement material and a layer (insulating layer) formed on the reinforcement material. The layer is formed by curing the aforementioned resin composition by heating at high temperature to the semi-cured stage, and the baking temperature for forming the prepregs is for example between 120° C. and 190° C. The reinforcement material may be a fibrous material, woven fabric and non-woven fabric, such as glass fiber fabric and so forth, so as to improve the mechanical strength of the prepregs. Preferably, the reinforcement material is optionally pre-treated by a silane coupling agent.

In a preferred embodiment, the prepreg is a low flow prepreg.

For instance, the resin composition of each embodiment in the present disclosure can be utilized to form laminates or copper-clad laminates, which comprise two metal foils and one insulating layer (such as the aforesaid layered structure); the insulating layer is disposed between the metal foils, and the insulating layer is formed by curing the aforementioned resin composition at high temperature and high pressure. The applicable curing temperature is, for example, between 150° C. and 230° C. The insulating layer may be the aforementioned prepreg or resin film. The metal foil may comprise copper, aluminum, nickel, platinum, silver, gold or an alloy thereof, such as a copper foil.

For instance, the resin composition of each embodiment in the present disclosure can be utilized to form rigid-flex boards, such as by combining a rigid-flex board and a flexible board, combining a rigid-flex board and a rigid board, or respectively combining a flexible board and a rigid board with different sides of a rigid-flex board. For instance, the low flow prepreg may be cut into a suitable shape and size, followed by lamination in the order of a double-sided flexible circuit board and a low flow prepreg, or in the order of a double-sided flexible circuit board, a film (such as a cover layer or an adhesive film with a polyimide film) and a low flow prepreg, or in the order of a single-sided flexible board and a low flow prepreg in contact with the copper-free side of the single-sided flexible board, or in the order of a rigid copper-clad laminate and a low flow prepreg, wherein any one of the aforesaid four lamination approaches is applicable. The combination is carried out according to any one or more of the aforementioned lamination orders, followed by a curing process performed at high pressure in vacuum at a temperature of between 150° C. and 230° C., so as to obtain a desired rigid-flex board.

In one embodiment, the rigid-flex board can be further processed to form a printed circuit board by trace processing. For instance, the printed circuit board can be prepared by using a conventional process for manufacturing a printed circuit board including a rigid-flex board.

The following examples describe the products or specimens made from the resin composition of the present disclosure and the preparation methods thereof.

Prepreg: Each resin composition of the following Examples and Comparative Examples was selected; after being well mixed, the resin composition was formed as a varnish, which was placed in an impregnation tank, and a fiberglass fabric (1080 E-glass fiber fabric) available from Asahi Corporation was impregnated in the impregnation tank, such that the resin composition was attached on the fiberglass fabric. After baking at 180° C. for about 4 minutes, a semi-cured prepreg was obtained.

Copper-clad laminate (5-ply, a five-layer laminate): Two sheets of copper foil with a 18 μm thickness and five sheets of the prepreg formed by each specimen were made, each prepreg having a resin content of about 60%. A copper foil, five prepregs and a copper foil were laminated in such order and subjected to lamination under vacuum, at 30 kgf/cm² pressure, at 190° C. for 1.5 hours to form a copper-clad laminate, wherein the five superimposed prepregs were cured to form the insulating layers between the two copper foils, and the resin content of the insulating layers is about 60%.

Copper-free laminate (5-ply): Each copper-clad laminate obtained above was etched for removing the two copper foils so as to obtain a copper-free laminate (5-ply), wherein the copper-free laminate (5-ply) was formed by laminating five prepregs, and the resin content of the copper-free laminate (5-ply) is about 60%.

Rigid-flex Board 1: A sheet of flexible board with trace formed on both sides (PDTL7123250 available from Microcosm Technology Co., Ltd.), a sheet of cover film (FHK0525 available from Taiflex Scientific Co., Ltd), a sheet of low flow prepreg, and a sheet of rigid copper-clad laminate (EM-285 copper-clad laminate available from Elite Material Co., Ltd.) were prepared. The flexible board with trace formed on both sides, the cover film, the low flow prepreg and the rigid copper-clad laminate were laminated in such order and then subjected to lamination under vacuum, at 190° C. and at 30 kgf/cm² pressure for 1.5 hours to form Rigid-flex Board 1.

Rigid-flex Board 2: A flexible board with trace formed on one side (20RL810 available from RCCT Technology Co., Ltd.), a sheet of low flow prepreg, and a sheet of rigid copper-clad laminate (EM-285) were prepared. The flexible board with trace formed on one side (having the copper-free side in contact with the low flow prepreg), the low flow prepreg and the rigid copper-clad laminate were laminated in such order under vacuum, at 190° C. and at 30 kgf/cm² pressure for 1.5 hours to form Rigid-flex Board 2.

Characteristics Description

The resin compositions of the present disclosure and various products made therefrom, such as prepregs, laminates, printed circuit boards or rigid-flex boards, can achieve one, multiple or all of the following desirable properties:

(1) Low resin flow (low flow in): such as having a resin flow of less than or equal to 60 mil, preferably less than or equal to 50, 40, 30, 25, 20 or 16 mil, such as between 15 mil and 60 mil. In general, resin compositions with low flow property are suitable for use in rigid-flex boards, whereas resin compositions with high flow property are not suitable for use in rigid-flex boards.

(2) High varnish compatibility and/or varnish stability: no layer separation is observed after the resin composition has been stirred and allowed to stand for 12 hours at room temperature; in addition, no particulate aggregation is formed; namely, no particles having a diameter of greater than 1 mm are observed by naked eyes. In general, poor varnish compatibility will result in layer separation. If a glass fiber fabric is impregnated with varnish prone to layer separation followed by lamination for forming the copper-clad laminate, it will easily cause delamination and low laminate quality stability; on the other hand, poor vanish stability will cause aggregation of varnish. If a glass fiber fabric is impregnated with aggregated varnish, there will be unevenness of varnish distribution on the surface of the prepreg, resulting in processing difficulty or low yield rate.

(3) Low dust weight loss: for example, the dust weight loss is less than or equal to 0.3%, preferably less than or equal to 0.2%, 0.15%, 0.10%, or 0.09%, such as between 0.09% and 0.3%, preferably between 0.09% and 0.2%. In general, a dust weight loss greater than 0.3% represents a serious loss, causing contamination of the surface circuit pattern of a circuit board, thus affecting the product quality and yield rate after lamination. Conventional low flow prepregs generally have the disadvantage of high dust weight loss. If these products are used in end-processing and lamination after drilling the circuit board, the circuit pattern will be contaminated due to dust loss, which causes short circuit due to the abnormal circuit connection or unevenness during the circuit board build-up process that subsequently increases the defective rate of products.

(4) High peel strength at high temperature: for example, the peel strength at 280° C. as measured by reference to IPC-TM-650 2.4.8 is greater than or equal to 5.0 lb/in, preferably greater than or equal to 5.3 lb/in or 5.5 lb/in, such as between 5.0 lb/in and 6.0 lb/in. In general, a copper-clad laminate having a peel strength at high temperature of less than 5 lb/in between the copper foil and the insulating layer has higher probability of peeling off the pad when the electronic component is welded to the circuit board at high temperature, thereby resulting in a low yield rate of finished products. In an example with the peel strength of greater than 5.0 lb/in at high temperature, the pad is more firmly secured without peeling off when the electronic component is welded to the circuit board, and a high yield rate is observed.

(5) High peel strength at room temperature: for example, the peel strength at room temperature (about 25° C.) as measured by reference to IPC-TM-650 2.4.8 is greater than or equal to 6.8 lb/in, preferably greater than or equal to 7.0 lb/in, 7.2 lb/in, 7.4 lb/in or 7.5 lb/in, such as between 6.8 lb/in and 7.8 lb/in.

(6) Low moisture absorption rate: for example, the moisture absorption rate at room temperature as measured by reference to IPC-TM-650 2.6.2.1a is less than or equal to 0.1%, preferably less than or equal to 0.09% or 0.08%, such as between 0.08% and 0.1%. In general, high moisture content of the laminate will cause the high probability of delamination at high temperature, lower thermal resistance and worsened dielectric properties of the laminate.

(7) A prepreg thus made having the following properties: after being subject to hot pressing at a pressure of 1452±70 kgf/16 in², having a resin flow as measured by reference to IPC-TM-650 2.3.17.2 of less than or equal to 25 mil, and having a dust weight loss of less than or equal to 0.2%.

(8) A laminate thus made having the following properties: having a peel strength at 280° C. as measured by reference to IPC-TM-650 2.4.8 of greater than or equal to 5.3 lb/in; having a peel strength at room temperature as measured by reference to IPC-TM-650 2.4.8 of greater than or equal to 6.8 lb/in; and/or having a moisture absorption rate at room temperature as measured by reference to IPC-TM-650 2.6.2.1a of less than or equal to 0.1%.

Compared with conventional resin compositions having different components and ratios, the present disclosure pertains to the resin composition and product thereof which can achieve any one or multiple or all of the aforementioned properties, such that it can better meet the demands of the industry.

Embodiments

Various raw materials from the following sources are used, and the resin compositions of Examples and Comparative Examples of the present disclosure are respectively prepared according to the use amounts of Table 1 and Table 2 to form multiple test samples.

Cresol novolac epoxy resin: N-680, available from D.I.C. Corporation.
Phenolic novolac epoxy resin: PNE-177, available from Chang Chun Plastics Co., Ltd.
Bisphenol A novolac epoxy resin: BNE-200, available from Chang Chun Plastics Co., Ltd.
DOPO-HQ epoxy resin: available from Chin Yee Chemical Industries Co., Ltd.
Low-Mw polyetheramine: D-400, having a weight average molecular weight of 430, available from Huntsman.
High-Mw polyetheramine: D-2010, having a weight average molecular weight of 2000, available from Huntsman.
Diamino diphenyl sulfone (DDS): available from Atul LTD.
Dicyandiamide (DICY): available from Kingyorker Enterprise Co., Ltd.
4,4'-diamino diphenyl ether (ODA): available from Sigma-Aldrich.
Phenol-novolac resin: TD-2090, available from D.I.C. Corporation.
Carboxyl-terminated butadiene-acrylonitrile copolymer (CTBN): 1072CGX, available from ZEON CHEMICALS.
Amine-terminated butadiene-acrylonitrile copolymer (ATBN): 1300X45, available from CVC Thermoset Specialties.
Phenoxy resin: YP50S, available from Nippon Steel & Sumikin Chemical Co., Ltd.
2-methylimidazole (2-MI): available from Sigma-Aldrich.
Silica (fused silicon dioxide): 525, available from Sibelco.
Dimethylacetamide (DMAC).

TABLE 1

Constitution of the resin compositions of Examples (unit: parts by weight)

| | Constitution | E1 | E2 | E3 | E4 | E5 | E6 | E7 | E8 | E9 | E10 |
|---|---|---|---|---|---|---|---|---|---|---|---|
| Epoxy resin | Cresol novolac epoxy resin | | | | | | | | | 40 | |
| | Phenolic novolac epoxy resin | | | | | | | 20 | 40 | | |
| | Bisphenol A novolac epoxy resin | 40 | 40 | 40 | 40 | 40 | 40 | 20 | | | 40 |
| | DOPO-HQ epoxy resin | 60 | 60 | 60 | 60 | 60 | 60 | 60 | 60 | 60 | 60 |
| Curing agent | Low-Mw polyetheramine | | | | | | | | | | |
| | High-Mw polyetheramine | 10 | 15 | 5 | 10 | 10 | 10 | 10 | 10 | 10 | 10 |
| | DDS | | | | | | | | | | |
| | DICY | 3 | 3 | 3 | 3 | 3 | 3 | 3 | 3 | 3 | 2 |
| | ODA | | | | | | | | | | |
| | Phenol novolac resin | | | | | | | | | | |
| Rubber | CTBN | | | | | | | | | | |
| | ATBN | 5 | 5 | 5 | 10 | 3 | 5 | 5 | 5 | 5 | 5 |
| Phenoxy resin | YP50S | 25 | 25 | 25 | 25 | 25 | 15 | 25 | 25 | 25 | 25 |
| Imidazole | 2-MI | 0.3 | 0.3 | 0.3 | 0.3 | 0.3 | 0.3 | 0.3 | 0.3 | 0.3 | 0.3 |
| Filler | Silica | 40 | 40 | 40 | 40 | 40 | 40 | 40 | 40 | 40 | 40 |
| Solvent | DMAC | 60 | 60 | 60 | 60 | 60 | 60 | 60 | 60 | 60 | 60 |

TABLE 2

Constitution of the resin compositions of Comparative Examples (unit: parts by weight)

| | Constitution | C1 | C2 | C3 | C4 | C5 | C6 | C7 | C8 | C9 | C10 |
|---|---|---|---|---|---|---|---|---|---|---|---|
| Epoxy resin | Cresol novolac epoxy resin | | | | | | | | | | |
| | Phenolic novolac epoxy resin | | | | | | | | | | |
| | Bisphenol A novolac epoxy resin | 40 | 40 | 40 | 40 | 40 | 40 | 40 | 40 | 40 | 40 |
| | DOPO-HQ epoxy resin | 60 | 60 | 60 | 60 | 60 | 60 | 60 | 60 | 60 | 60 |
| Curing agent | Low-Mw polyetheramine | 10 | | | | | | | | | 10 |
| | High-Mw polyetheramine | | | | | 25 | 3 | 10 | 10 | 10 | |
| | DDS | | 10 | | | | | | | | |
| | DICY | 3 | 3 | 3 | 3 | 3 | 3 | 3 | 3 | 3 | 3 |
| | ODA | | | | 10 | | | | | | |
| | Phenol novolac resin | | | | 10 | | | | | | |
| Rubber | CTBN | | | | | | | | | 5 | 5 |
| | ATBN | 5 | 5 | 5 | 5 | 5 | 5 | 15 | | | |
| Phenoxy resin | YP50S | 25 | 25 | 25 | 25 | 25 | 25 | 25 | 25 | 25 | 25 |
| Imidazole | 2-MI | 0.3 | 0.3 | 0.3 | 0.3 | 0.3 | 0.3 | 0.3 | 0.3 | 0.3 | 0.3 |
| Filler | Silica | 40 | 40 | 40 | 40 | 40 | 40 | 40 | 40 | 40 | 40 |
| Solvent | DMAC | 60 | 60 | 60 | 60 | 60 | 60 | 60 | 60 | 60 | 60 |

The method of measuring each property is described below.

Varnish compatibility: Each resin composition of Examples and Comparative Examples was well mixed and stirred according to the ratio shown to form a varnish. The varnish was allowed to stand for 12 hours at room temperature after being stirred and was inspected with naked eyes to determine whether layer separation occurs. Varnishes without layer separation were designated as compatible. Varnishes with layer separation were designated as layer separation.

Varnish stability: Each resin composition of Examples and Comparative Examples was well mixed and stirred according to the ratio shown to form a varnish. The varnish was inspected with naked eyes to determine whether aggregation of particulates occurs (formation of particulates with diameter of greater than or equal to about 1 mm).

Flow in: 3 sheets of prepreg (4.0×4.0 in) were punched with a manual punch to form two circular holes with a diameter of 25 mm. By reference to the definition of IPC-TM-650 2.3.17.2, the punched prepregs were stacked in the order of "steel plate/release film/buffer material/release film/3 prepregs/15 mil laminate/steel plate". After that, they were subject to hot pressing at a temperature of 171±3° C. and at a pressure of 1452±70 kgf/16 in$^2$ for 5 minutes. The test sample was then placed on the resin flow analysis system (model SP-IMSV7, available from Sanpany Instruments Co., Ltd.) for flow in measurement. During the measurement, conditions and parameters not described in detail can be referred from IPC-TM-650 2.3.17.2.

Dust weight loss: The prepreg was cut to a size of 10 cm×10 cm (length×width) and weighed as W0. Then the prepreg was cut with a blade according to the following process: a length of 9 cm per cut; all cuttings being perpendicular to the same specific side of the prepreg and performed 30 times in parallel. Then at a frequency of 2 times per second and at an amplitude of vibration of about 10 cm by hand, the prepreg was waved up and down for fifty times and then weighed as W1; the dust weight loss was calculated according to the formula (dust weight loss (%)=((W0−W1)/W0)×100%), and the average of four repetitions was recorded.

Peel strength at room temperature (P/S at room temperature): the copper-clad laminate (5-ply) was cut into a rectangular sample with a width of 24 mm and a length of greater than 60 mm, and the surface copper foil was etched, leaving only a rectangular copper foil with a width of 3.18 mm and a length of greater than 60 mm; by using a universal tensile tester (available from Shimadzu) by reference to IPC-TM-650 2.4.8 at room temperature (about 25° C.), the peel strength required for pulling the copper foil away from the surface of the laminate was measured (lb/in).

Peel strength at high temperature (P/S at high temperature): the copper-clad laminate (5-ply) was cut into a rectangular sample with a width of 24 mm and a length of greater than or equal to 60 mm, and the surface copper foil was etched, leaving only a rectangular copper foil with a width of 3.18 mm and a length of greater than or equal to 60 mm; by using a universal tensile tester (available from Shimadzu) by reference to IPC-TM-650 2.4.8, the peel strength required for pulling the copper foil away from the surface of the laminate was measured (lb/in). Particularly, during the measurement of high temperature P/S, kits of the universal tensile tester and the laminate were both heated to 280° C. to ensure the test environment and the laminate are both at 280° C.

Moisture absorption rate: a copper-free laminate (5-ply) 2 in.×2 in. in size was placed in an oven at 105±10° C. and baked for 1 hour; after removal, it was cooled at room temperature (about 25° C.) for 10 minutes and weighed as W1. The laminate was immersed in pure water for 24 hours at room temperature, and then the laminate was taken out and wiped for removing remaining water on the surface. After that, the laminate was weighed again as W2, The moisture absorption rate was calculated according to the formula (moisture absorption rate (%)=((W2−W1)/W1)×100%). In moisture absorption rate measurement, conditions and parameters not described in detail can be referred from IPC-TM-650 2.6.2.1a.

The test results are listed in Table 3 and Table 4 below.

TABLE 3

Test results of Examples

| Property | Unit | E1 | E2 | E3 | E4 | E5 | E6 | E7 | E8 | E9 | E10 |
|---|---|---|---|---|---|---|---|---|---|---|---|
| Varnish compatibility | N.A. | C | C | C | C | C | C | C | C | C | C |
| Varnish stability | N.A. | N | N | N | N | N | N | N | N | N | N |
| Flow in | mil | 16 | 18 | 18 | 17 | 19 | 21 | 19 | 18 | 18 | 16 |
| Dust weight loss | % | 0.13 | 0.12 | 0.14 | 0.09 | 0.13 | 0.20 | 0.14 | 0.14 | 0.19 | 0.17 |
| Peel strength at room temperature | lb/in | 7.45 | 7.52 | 7.41 | 6.81 | 7.68 | 7.35 | 7.36 | 7.31 | 7.42 | 7.12 |
| Peel strength at high temperature | lb/in | 5.45 | 5.47 | 5.42 | 5.30 | 5.57 | 5.31 | 5.31 | 5.32 | 5.38 | 5.30 |
| Moisture absorption rate | % | 0.08 | 0.09 | 0.08 | 0.09 | 0.08 | 0.09 | 0.10 | 0.08 | 0.09 | 0.08 |

Note:
C represents compatible;
L represents layer separation;
N represents no aggregation; and
A represents aggregation.

TABLE 4

Test results of Comparative Examples.

| Property | Unit | C1 | C2 | C3 | C4 | C5 | C6 | C7 | C8 | C9 | C10 |
|---|---|---|---|---|---|---|---|---|---|---|---|
| Varnish compatibility | N.A. | C | C | C | C | C | C | C | C | L | L |
| Varnish stability | N.A. | A | N | A | N | N | N | N | N | N | A |
| Flow in | mil | 21 | 20 | 19 | 17 | 16 | 16 | 20 | 19 | 19 | 17 |

TABLE 4-continued

Test results of Comparative Examples.

| Property | Unit | C1 | C2 | C3 | C4 | C5 | C6 | C7 | C8 | C9 | C10 |
|---|---|---|---|---|---|---|---|---|---|---|---|
| Dust weight loss | % | 0.33 | 0.36 | 0.39 | 0.41 | 0.13 | 0.27 | 0.12 | 0.33 | 0.24 | 0.36 |
| Peel strength at room temperature | lb/in | 7.21 | 6.70 | 6.72 | 6.45 | 7.65 | 6.86 | 6.45 | 7.37 | 5.95 | 5.85 |
| Peel strength at high temperature | lb/in | 5.38 | 4.60 | 4.55 | 4.68 | 5.10 | 5.20 | 4.88 | 5.31 | 4.89 | 4.80 |
| Moisture absorption rate | % | 0.17 | 0.16 | 0.22 | 0.15 | 0.16 | 0.07 | 0.09 | 0.08 | 0.09 | 0.17 |

The following observations can be made from the comparison of Table 1 to Table 4.

From E1 and C1, it is observed that as compared with the low molecular weight polyetheramine, the high molecular weight polyetheramine, as a curing agent, when being used in conjunction with an epoxy resin and an amine-terminated acrylonitrile rubber, can achieve the advantages of better varnish stability, lower dust weight loss of a prepreg made therefrom, and lower moisture absorption rate of a copper-free laminate made therefrom.

From E1 and C2 to C4, it is observed that as compared with amine curing agents or phenolic curing agents, the high molecular weight polyetheramine, as a curing agent, when being used in conjunction with an epoxy resin and an amine-terminated acrylonitrile rubber, can achieve the advantages of better varnish stability, lower dust weight loss of a prepreg made therefrom, better peel strength at room temperature and high temperature of a laminate made therefrom, and lower moisture absorption rate of a copper-free laminate made therefrom; specifically, the low moisture content may effectively prevent a laminate from delamination at high temperature after moisture absorption.

From E1 and C9 to C10, it is observed that as compared with CTBN (other type of acrylonitrile), the ATBN as an amine-terminated acrylonitrile rubber, when being used in conjunction with a high molecular weight polyetheramine and an epoxy resin, forms a varnish with better compatibility without layer separation, particularly providing a prepreg with surface evenness and lower dust weight loss and a laminate having high adhesion with copper foil after lamination.

It can be observed from the test results of Examples and Comparative Examples that a resin composition made from an epoxy resin used in conjunction with a high molecular weight polyetheramine and an amine-terminated acrylonitrile rubber may achieve a better peel strength at room temperature (such as a peel strength at room temperature of greater than 6.8 lb/in) and a better peel strength at high temperature (such as a peel strength at high temperature of greater than 5.3 lb/in), while achieving the advantages of improved dust loss (such as a dust weight loss of less than 0.2%) and low moisture absorption rate (such as a moisture absorption rate of less than 0.1%).

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A prepreg for connecting a rigid board and a flexible board, comprising a reinforcement material and an insulation material covering the reinforcement material, the insulation material being formed by baking a resin composition to a semi-cured stage, the resin composition comprising 100 parts by weight of an epoxy resin, 5 to 15 parts by weight of a high molecular weight polyetheramine and 3 to 10 parts by weight of an amine-terminated acrylonitrile rubber, wherein the prepreg has a dust weight loss of less than or equal to 0.2%; and wherein a laminate made from the prepreg has the following properties: a peel strength at 280° C. as measured by reference to IPC-TM-650 2.4.8 of greater than or equal to 5.3 lb/in; and a peel strength at room temperature as measured by reference to IPC-TM-650 2.4.8 of greater than or equal to 6.8 lb/in.

2. The prepreg according to claim 1, wherein the high molecular weight polyetheramine has a weight average molecular weight of greater than or equal to 1000.

3. The prepreg according to claim 1, wherein the high molecular weight polyetheramine comprises the following structure:

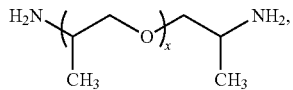

wherein 15≤x≤80.

4. The prepreg according to claim 1, wherein the amine-terminated acrylonitrile rubber comprises an amine-terminated butadiene-acrylonitrile copolymer.

5. The prepreg according to claim 1, wherein the amine-terminated acrylonitrile rubber comprises the following structures:

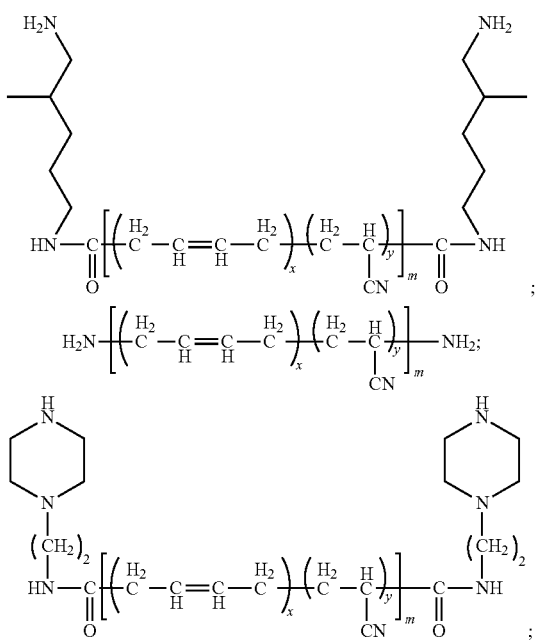

and a combination thereof;

wherein 60≤m≤75; and wherein x is 60% to 90% and y is 10% to 40% with the proviso that the sum of x and y is 100%.

6. The prepreg according to claim 1, wherein the resin composition further comprises: amine curing agent, phenolic resin, polyphenylene oxide, polyvinyl butyral, polyolefin, polyester resin, styrene maleic anhydride, benzoxazine resin, maleimide, cyanate ester resin or a combination thereof.

7. The prepreg according to claim 1, wherein the resin composition further comprises: a flame retardant, an inorganic filler, a curing accelerator, a solvent, a silane coupling agent or a combination thereof.

8. A prepreg for connecting a rigid board and a flexible board, comprising a reinforcement material and an insulation material covering the reinforcement material, the insulation material being formed by baking a resin composition to a semi-cured stage, the resin composition comprising:
100 parts by weight of an epoxy resin;
5 to 15 parts by weight of a high molecular weight polyetheramine; and
3 to 10 parts by weight of an amine-terminated acrylonitrile rubber;
wherein the high molecular weight polyetheramine comprises the following structure:

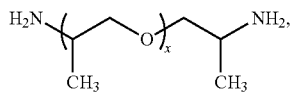

wherein 25≤x≤50;
wherein the amine-terminated acrylonitrile rubber is an amine-terminated butadiene-acrylonitrile copolymer;
wherein the prepreg has a dust weight loss of less than or equal to 0.2%; and
wherein a laminate made from the prepreg has the following properties: a peel strength at 280° C. as measured by reference to IPC-TM-650 2.4.8 of greater than or equal to 5.3 lb/in; and a peel strength at room temperature as measured by reference to IPC-TM-650 2.4.8 of greater than or equal to 6.8 lb/in.

9. A product made from the prepreg according to claim 1, comprising a laminate, a printed circuit board or a rigid-flex board.

10. The product according to claim 9, having a resin flow of less than or equal to 60 mil.

11. The product according to claim 9, having a moisture absorption rate at room temperature as measured by reference to IPC-TM-650 2.6.2.1a of less than or equal to 0.1%.

12. The prepreg according to claim 1,
having a resin flow as measured by reference to IPC-TM-650 2.3.17.2 of less than or equal to 25 mil after being subject to hot pressing at a pressure of 1452±70 kgf/16 in$^2$,
wherein the laminate made from the prepreg has
a moisture absorption rate at room temperature as measured by reference to IPC-TM-650 2.6.2.1a of less than or equal to 0.1%.

* * * * *